United States Patent
Asada

(10) Patent No.: US 12,429,656 B2
(45) Date of Patent: Sep. 30, 2025

(54) BOOT, FERRULE STRUCTURE, AND METHOD FOR MANUFACTURING FERRULE-EQUIPPED FIBER

(71) Applicant: FUJIKURA LTD., Tokyo (JP)

(72) Inventor: Hirotaka Asada, Chiba (JP)

(73) Assignee: FUJIKURA LTD., Tokyo (JP)

( * ) Notice: Subject to any disclaimer, the term of this patent is extended or adjusted under 35 U.S.C. 154(b) by 276 days.

(21) Appl. No.: 18/252,533

(22) PCT Filed: Aug. 25, 2021

(86) PCT No.: PCT/JP2021/031232
§ 371 (c)(1),
(2) Date: May 11, 2023

(87) PCT Pub. No.: WO2022/158019
PCT Pub. Date: Jul. 28, 2022

(65) Prior Publication Data
US 2024/0019643 A1    Jan. 18, 2024

(30) Foreign Application Priority Data

Jan. 22, 2021   (JP) ................................. 2021-008665

(51) Int. Cl.
*G02B 6/38*    (2006.01)
(52) U.S. Cl.
CPC ......... *G02B 6/3885* (2013.01); *G02B 6/3861* (2013.01); *G02B 6/38875* (2021.05)
(58) Field of Classification Search
CPC . G02B 6/3885; G02B 6/3861; G02B 6/38875
See application file for complete search history.

(56) References Cited

U.S. PATENT DOCUMENTS 5,764,836 A    6/1998   Roff
6,290,527 B1   9/2001   Takaya et al.
(Continued)

FOREIGN PATENT DOCUMENTS

JP    2002-328264 A    11/2002
JP    2003-50339 A     2/2003
(Continued)

OTHER PUBLICATIONS

International Search Report issued in corresponding International Application No. PCT/JP2021/031232 mailed Nov. 9, 2021 (4 pages).

*Primary Examiner* — Michael P Mooney
(74) *Attorney, Agent, or Firm* — Osha Bergman Watanabe & Burton LLP

(57) ABSTRACT

A boot configured to be attached to a ferrule includes: a fiber insertion hole into which optical fibers are inserted; a lower part on one side with respect to the fiber insertion hole; and an upper part on another side with respect to the fiber insertion hole. The fiber insertion hole is disposed to correspond with fiber holes of the ferrule that are disposed in an array in one direction. The upper part includes a protrusion part that protrudes relative to an end surface of the lower part in a fiber insertion direction. The ferrule includes: an adhesive filling part configured to be filled with an adhesive; and a stepped part that guides the optical fibers into the fiber holes.

10 Claims, 11 Drawing Sheets

(56) References Cited

U.S. PATENT DOCUMENTS

| | | | |
|---|---|---|---|
| 2003/0133688 A1* | 7/2003 | Wing Leung | ........ G02B 6/3885 385/137 |
| 2016/0320570 A1 | 11/2016 | Watanabe et al. | |
| 2021/0208338 A1* | 7/2021 | Takahashi | ................ G02B 6/30 |

FOREIGN PATENT DOCUMENTS

| | | |
|---|---|---|
| JP | 2003-131069 A | 5/2003 |
| JP | 2004-045751 A | 2/2004 |
| JP | 2005-099477 A | 4/2005 |
| JP | 2006-053482 A | 2/2006 |
| JP | 2006-184680 A | 7/2006 |
| JP | 2009-193030 A | 8/2009 |
| JP | 2009-300577 A | 12/2009 |
| JP | 2011-013635 A | 1/2011 |
| JP | 2019-101233 A | 6/2019 |
| JP | 2020-071376 A | 5/2020 |

* cited by examiner

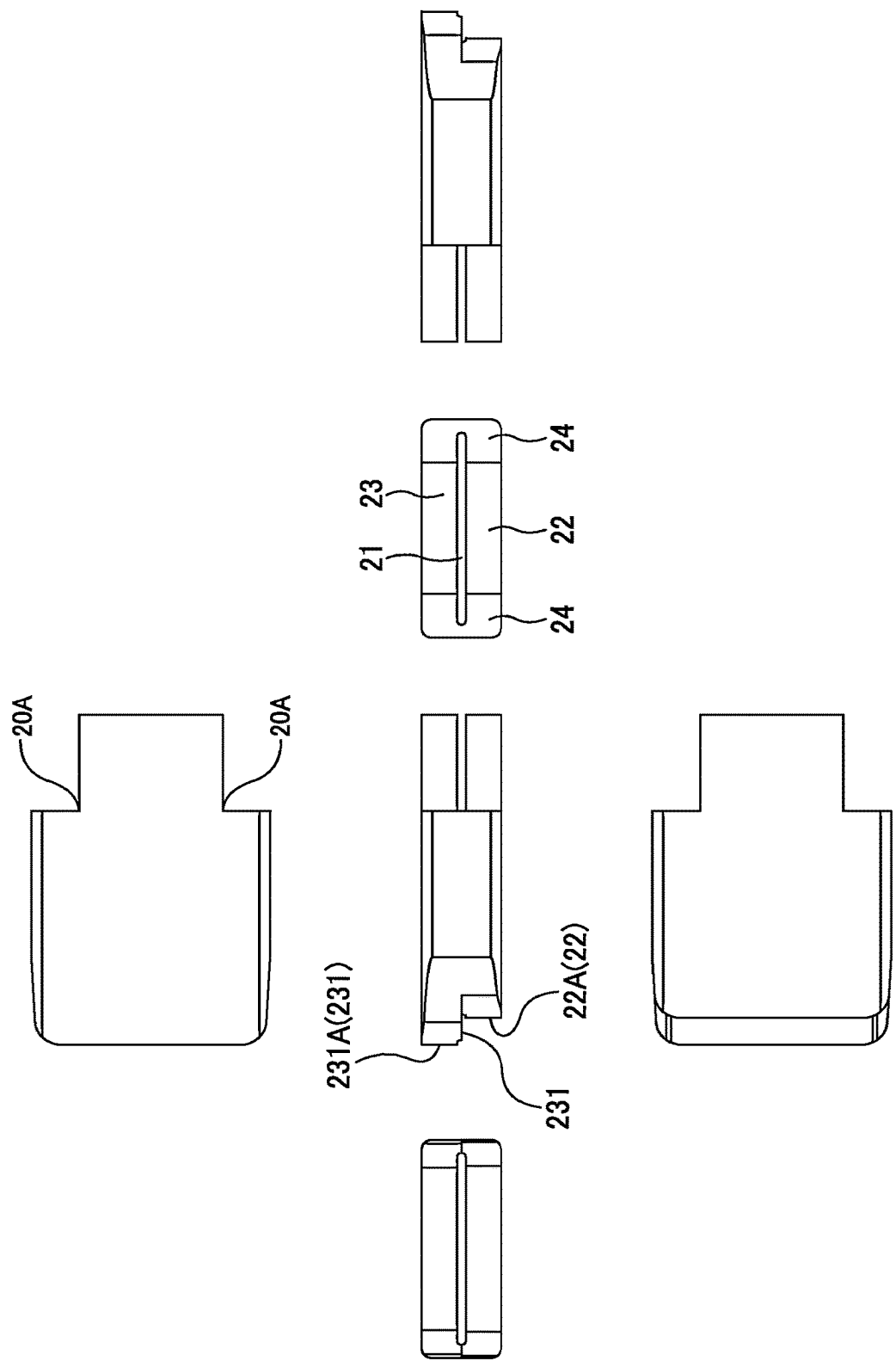

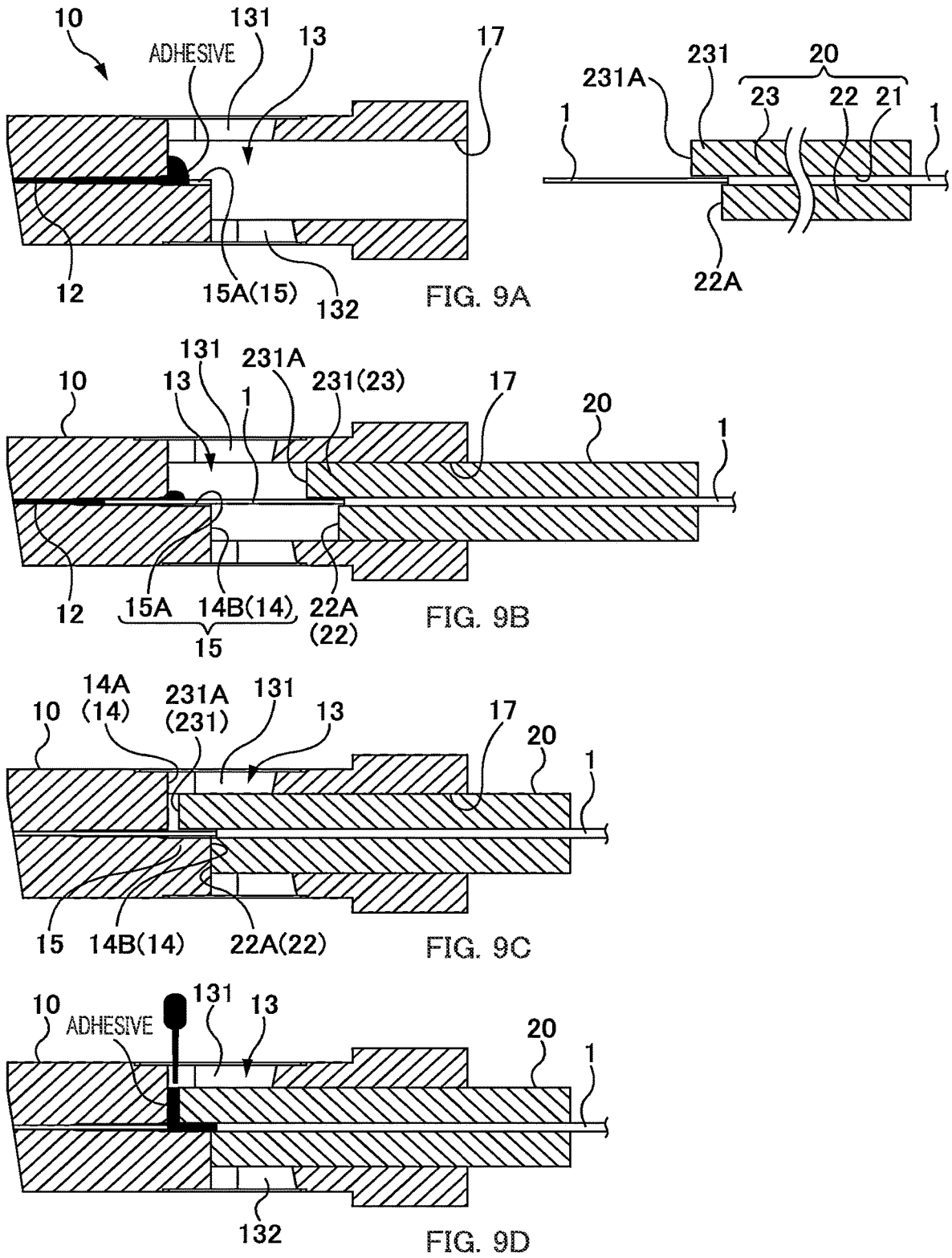

BOOT, FERRULE STRUCTURE, AND METHOD FOR MANUFACTURING FERRULE-EQUIPPED FIBER

TECHNICAL FIELD

The present disclosure relates to a boot, a ferrule structure, and a method for manufacturing a ferrule-equipped fiber.

The present application claims priority based on Japanese Patent Application No. 2021-008665 filed on Jan. 22, 2021, the contents of which are incorporated herein by reference.

BACKGROUND

An MT ferrule is a known type of ferrule that collectively connects a plurality of optical fibers. Such a ferrule includes an adhesive filling part. The optical fibers are fixed to the ferrule by filling the adhesive filling part with an adhesive. For example, PTL 1 describes a ferrule that can be filled with an adhesive from an adhesive inlet.

PATENT LITERATURE

PTL 1: Japanese Patent Application Laid-open Publication No. 2003-131069

The ferrule may deform due to contraction of the adhesive filled in the ferrule. To deal with this, PTL 1 describes forming the ferrule's fiber holes, guide pin holes, etc., with a resin that is insert-molded in a metal frame. However, the ferrule described in PTL 1 has a complicated configuration and requires high manufacturing cost.

SUMMARY

One or more embodiments of the present invention provide a new configuration that can suppress deformation of a ferrule.

A boot according to one or more embodiments of the present invention is a boot configured to attach to a ferrule including a plurality of fiber holes that are disposed to be arrayed in one direction, an adhesive filling part configured to be filled with an adhesive, and a stepped part configured to guide a plurality of optical fibers to the fiber holes. The boot includes: a fiber insertion hole configured to insert the plurality of optical fibers, the fiber insertion hole being disposed in correspondence with the disposition of the plurality of fiber holes; a lower part disposed on one side with respect to the fiber insertion hole; and an upper part disposed on another side with respect to the fiber insertion hole. The upper part includes a protrusion part that protrudes relative to an end surface of the lower part in a fiber insertion direction.

Other features of the invention will become apparent from the following description of the present Specification and Drawings.

According to one or more embodiments of the present invention, it is possible to suppress deformation of a ferrule by reducing the amount of adhesive to be filled into an adhesive filling part.

BRIEF DESCRIPTION OF THE DRAWINGS

FIG. 4 illustrates orthographic projections of a boot 20 in one or more embodiments taken from various directions.

FIGS. 9A to 9D are explanatory views of a method for manufacturing a ferrule-equipped fiber.

DETAILED DESCRIPTION

Embodiments as examples of the present invention are described according to the following descriptions of the specification and the drawings.

First Embodiments

Figure 1A:
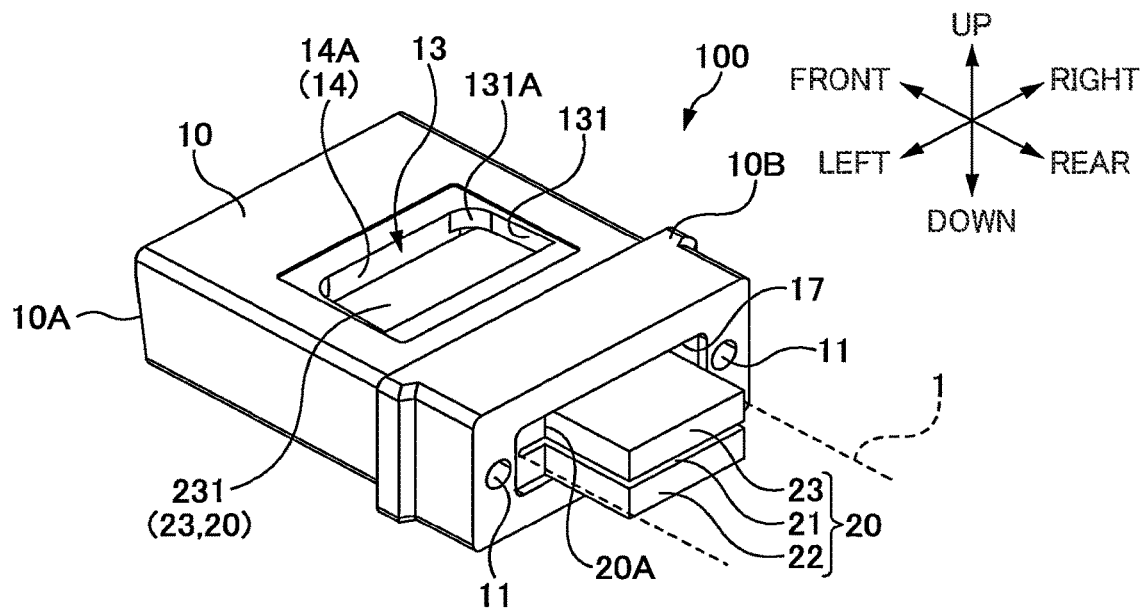
FIG. 1A is a perspective view of a ferrule structure 100.
Figure 1B:
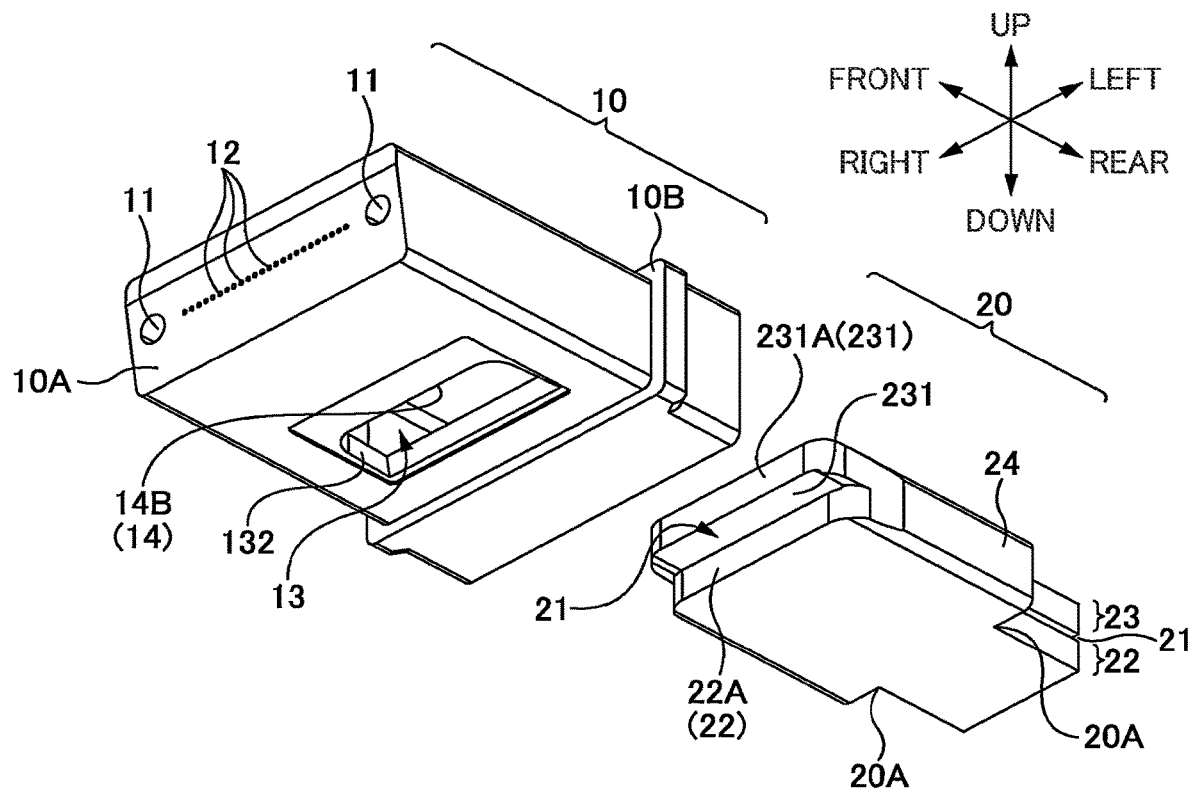
FIG. 1B is an exploded explanatory view of the ferrule structure 100.
Figure 2:
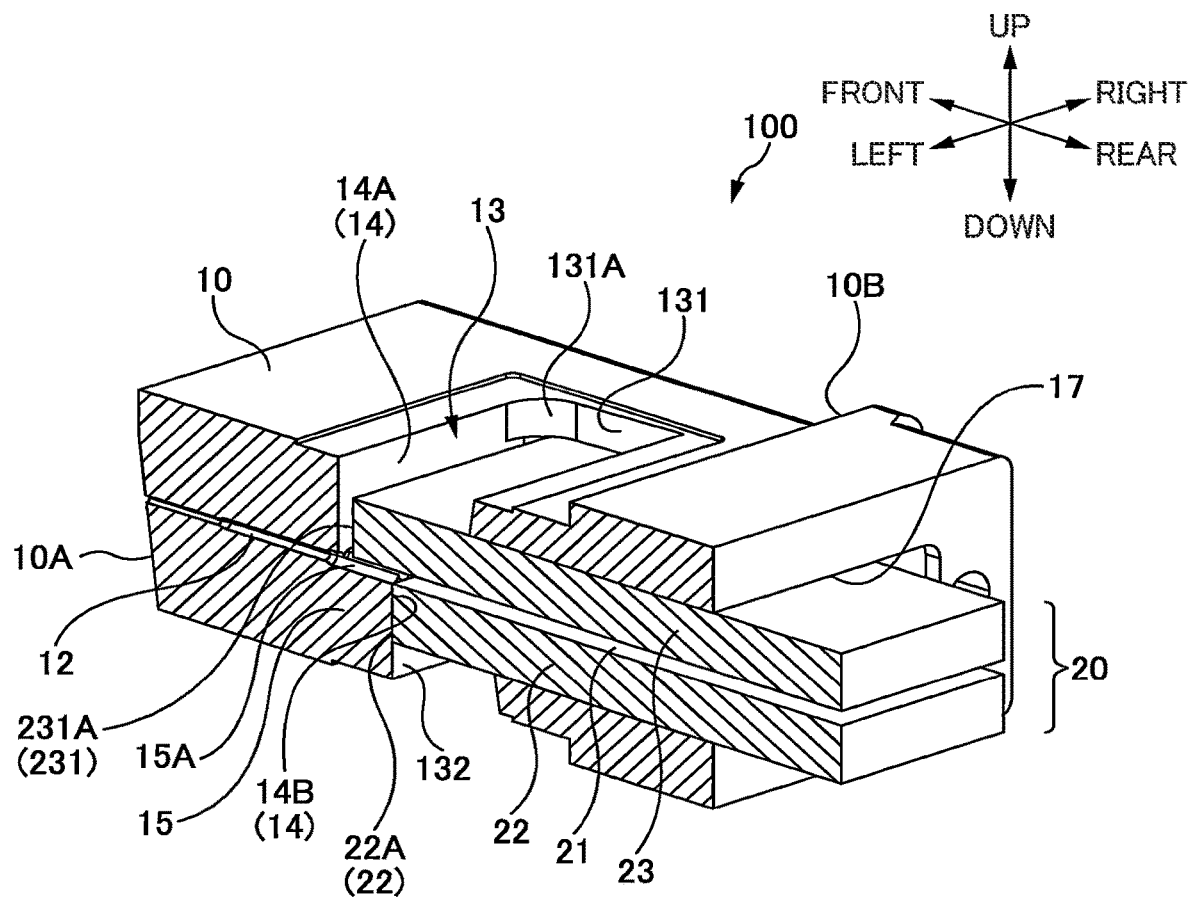
FIG. 2 is a cross-sectional perspective view of the ferrule structure 100.
Figure 3A:
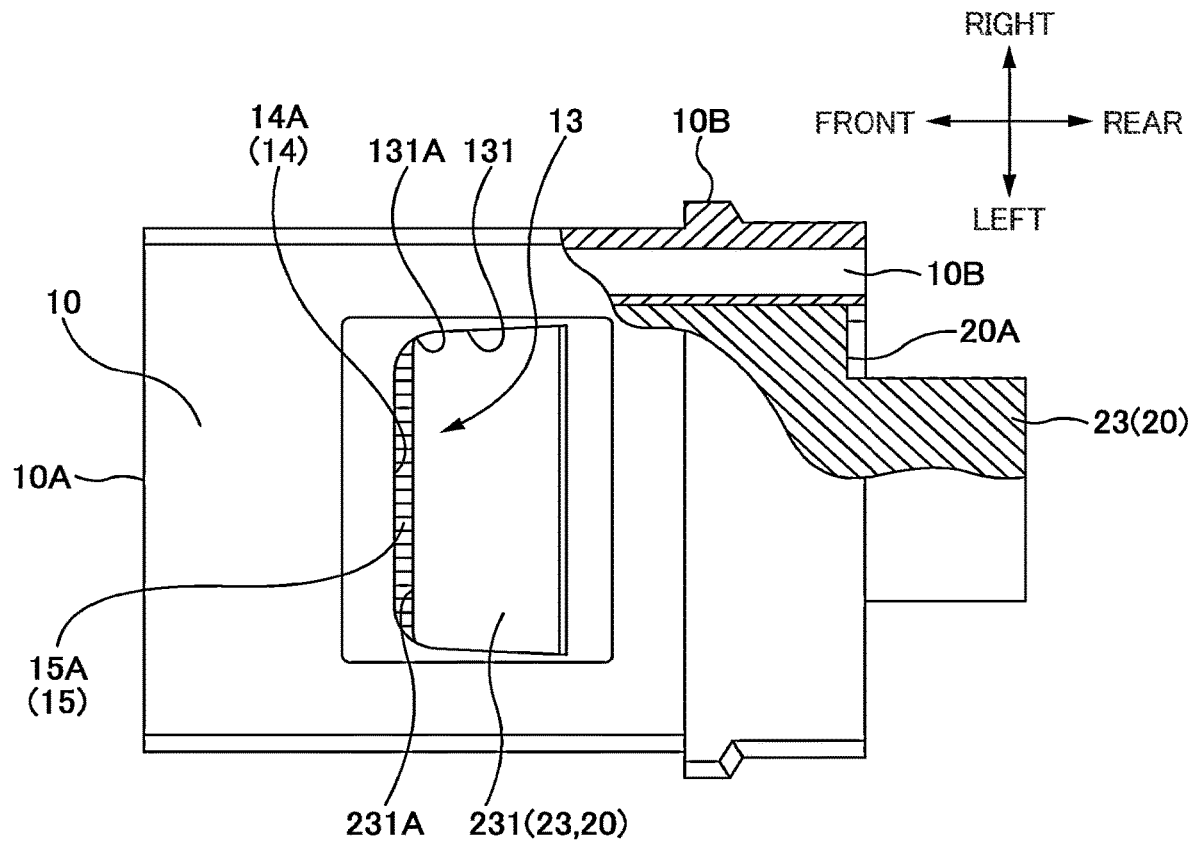
FIG. 3A is a top view of the ferrule structure 100.
Figure 3B:
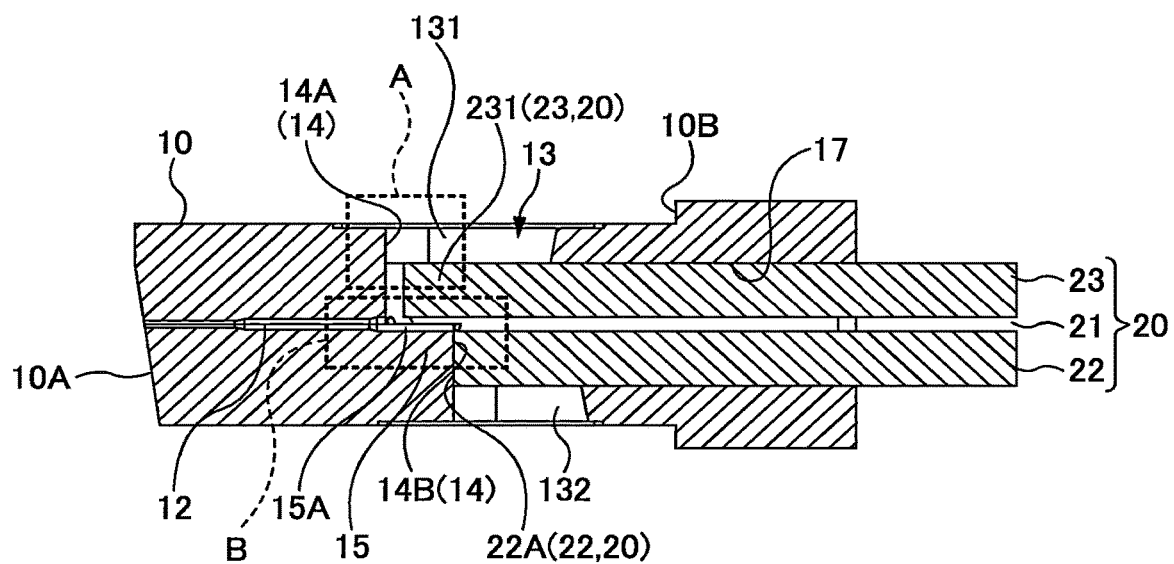
FIG. 3B is a cross-sectional view of the ferrule structure 100.

FIG. 1A is a perspective view of a ferrule structure 100. FIG. 1B is an exploded explanatory view of the ferrule structure 100. FIG. 2 is a cross-sectional perspective view of the ferrule structure 100. FIG. 3A is a top view of the ferrule structure 100. FIG. 3B is a cross-sectional view of the ferrule structure 100. Note that the dotted lines in FIG. 1A indicate an optical fiber ribbon constituted by a plurality of optical fibers 1.

In the following description, directions are defined as follows. The direction in which an optical fiber 1 is inserted into a boot 20 (or ferrule 10) is defined as the "fiber insertion direction" or "front-rear direction", and with reference to the optical fiber 1 inserted into the boot 20 (or ferrule 10), the tip end side of the optical fiber 1 is defined as "front" while the opposite side therefrom is defined as "rear". Note that, the optical axis direction of the optical fiber 1 inserted into the boot 20 (or ferrule 10) (the direction of the longitudinal axis) coincides with the fiber insertion direction (or the front-rear direction). The direction in which a plurality of optical fibers 1 inserted into the boot 20 (or ferrule 10) are arrayed—i.e., the direction orthogonal to the optical axis direction (the direction of the longitudinal axis)—is defined as the "width direction" or "left-right direction", and the right side when viewing from the rear side to the front side is defined as "right" while the opposite side therefrom is defined as "left". The direction perpendicular to the fiber insertion direction (the front-rear direction) and the width direction (the left-right direction)—i.e., the direction orthogonal to a plane formed by the optical axis direction (the direction of the longitudinal axis) and the width direction—is defined as the "up-down direction", and the side of an upper part with respect to a fiber insertion hole 21 of the boot 20 is defined as "up" while the opposite side therefrom is defined as "down". Note that, the upper side may be referred to as the "filling window side", and the lower side may be referred to as the "bottom side".

The ferrule structure 100 includes a ferrule 10 and a boot 20. Note that, a member including optical fibers 1 fixed to the ferrule structure 100 may be referred to as a "ferrule-equipped fiber".

The ferrule 10 is a member that holds respective end parts of a plurality of optical fibers 1. The ferrule 10 in one or more embodiments is an MT connector (an MT ferrule) defined by JIS C 5981 and IEC 61754-5. A main body of the ferrule 10 includes a connection end surface 10A and an outer wall. The connection end surface 10A is the end surface of the ferrule 10 on the front side, and is an end surface to be connected to a mating ferrule (not illustrated herein). The outer wall constitutes outer surfaces that are contiguous to the connection end surface 10A (i.e., outer surfaces of the main body of the ferrule 10 located mainly on the upper, lower, left, and right sides). A pair of guide holes 11 is disposed in the right and left of the ferrule 10. A flange part 10B (a rim part) protruding outward from the side surfaces of the main body of the ferrule 10 is disposed in a rear part of the ferrule 10.

The ferrule 10 in one or more embodiments includes a plurality of fiber holes 12, an adhesive filling part 13, an inner wall 14, a stepped part 15, and a boot insertion port 17.

The fiber holes 12 are holes for inserting end parts of the optical fibers 1. The end part of each optical fiber 1 is fixed to the corresponding fiber hole 12, respectively. The plurality of fiber holes 12 are disposed side by side in the width direction (disposed so as to be arrayed in one direction). Here, twenty-four fiber holes 12 are arrayed in a single row in the width direction. However, the number of the fiber holes 12 is not limited to twenty-four. Also, the fiber holes 12 may be arrayed in a single row, or in two or more rows. One end part (the rear end) of the fiber hole 12 opens in the inner wall 14 (more specifically, a first surface 14A) of the adhesive filling part 13. The other end part (the front end) of the fiber hole 12 opens in the connection end surface 10A of the ferrule 10. Note that, the fiber holes 12 are in communication with guide grooves 15A described below.

The adhesive filling part 13 is a part (a space) that is configured to be filled with an adhesive. An upper opening 131 (an adhesive-filling window) is located in an upper surface of the ferrule 10. The upper opening 131 is an opening that opens through to the adhesive filling part 13 from the outer wall of the ferrule 10. The adhesive filling part 13 is filled with an adhesive from this upper opening 131. Additionally, a lower opening 132 is located in a lower surface of the ferrule 10. The lower opening 132 is an opening that opens through to the adhesive filling part 13 from the outer wall of the ferrule 10. The lower opening 132 is disposed on the opposite side from the upper opening 131. As described later, by providing these openings in the upper surface and lower surface of the ferrule 10, it is possible to suppress distortion of the ferrule 10 due to contraction that occurs with hardening of the adhesive. Note, however, that the lower opening 132 does not have to be provided in the lower surface of the ferrule 10. The fiber holes 12 open in the front-side inner wall surface (first surface 14A) of the adhesive filling part 13. A retaining part 131A is located on a wall surface on the upper side of the adhesive filling part 13.

The inner wall 14 includes respective openings of the plurality of fiber holes 12, and is disposed in the main body of the ferrule 10. A space disposed on the opposite side from the connection end surface 10A with respect to the inner wall 14 is the adhesive filling part 13. In other words, the inner wall 14 is a wall surface, among the wall surfaces constituting the adhesive filling part 13, that is on the side of the connection end surface 10A (i.e., the front side of the adhesive filling part 13; the side where the fiber holes 12 open). In one or more embodiments, the inner wall 14 has a first surface 14A and a second surface 14B. The first surface 14A is disposed along an edge of the upper opening 131 on the side of the connection end surface 10A (the front side). The upper opening 131 is opened at the location along the first surface 14A. The second surface 14B is a surface protruding toward the adhesive filling part 13 (toward the rear side) from the first surface 14A, and is the rear end surface of the stepped part 15. In the first embodiments, the second surface 14B is a surface along an edge of the lower opening 132 on the side of the connection end surface (the front side). The lower opening 132 is opened at the location along the second surface 14B.

The stepped part 15 is a step located inside the adhesive filling part 13 and is configured to guide the optical fibers 1 to the fiber holes 12. A plurality of guide grooves are disposed on an upper surface of the stepped part 15. The guide grooves 15A are grooves for guiding the optical fibers 1 to the fiber holes 12. The guide grooves 15A are grooves along the fiber insertion direction (the front-rear direction). The plurality of guide groove 15A are disposed side by side so as to be arrayed in the width direction. The guide grooves 15A herein are formed as round grooves with a semi-circular cross section. However, the guide grooves 15A may be in another shape such as a V groove, a round groove with a semi-circular cross section, a U groove, or a rectangular groove, for example. Note that, the upper surface of the stepped part 15 does not have to include the guide grooves 15A. Front ends of the guide grooves 15A reach the inner wall 14 (specifically, the first surface 14A) on the front side of the adhesive filling part 13. The front ends of the guide grooves are in communication with the openings of the fiber holes 12. Rear ends of the guide grooves 15A reach the second surface 14B, which is the rear end surface of the stepped part 15. The rear end surface (the second surface 14B) of the stepped part 15 is formed as a surface perpendicular to the fiber insertion direction. The second surface 14B functions as an alignment surface for aligning the attachment direction of the boot 20 (the front-rear direction).

The guide grooves 15A are located on the upper surface (the surface on the side of the upper opening 131) of the stepped part 15. Thus, when the boot 20 is not inside the adhesive filling part 13, an operator can confirm the inside of the adhesive filling part 13 through the upper opening 131 while inserting the optical fibers 1 into the fiber holes 12, and can also confirm how the respective end parts of the optical fibers 1 are being guided by the guide grooves 15A. In one or more embodiments, however, the end part of the boot 20 is inserted to the interior of the adhesive filling part 13 as will be described later, and a part of the upper opening 131 is blocked by the upper surface of the boot 20 (refer to FIGS. 1A, 2, and 3B).

The boot insertion port 17 is an opening for inserting the boot 20. The boot insertion port 17 is located at a rear end of the ferrule 10. The boot insertion port 17 is in communication with the adhesive filling part 13. The boot insertion port 17 enables insertion of the plurality of optical fibers 1. The optical fibers 1 inserted from the boot insertion port 17 pass through the adhesive filling part 13 and are inserted into the fiber holes 12. In one or more embodiments, the end part of the boot 20 is inserted to the interior of the adhesive filling part 13 by making use of the configuration that the boot insertion port 17 is in communication with the adhesive filling part 13.

Figure 11:
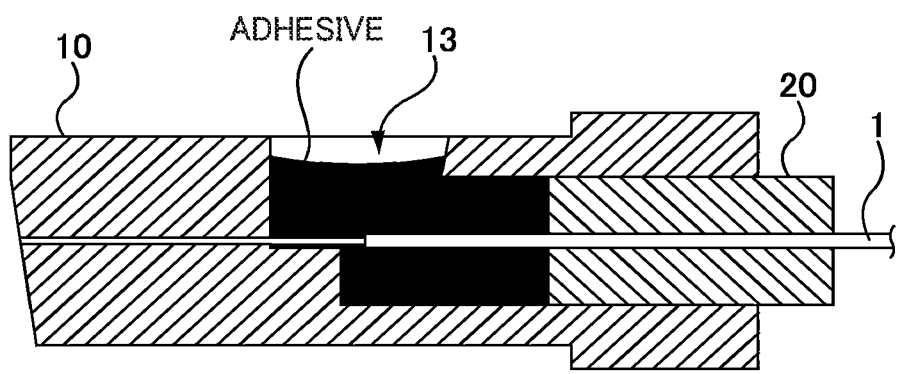
FIG. 11 is an explanatory view of a comparative example.

FIG. 11 is an explanatory view of a comparative example.

In ordinary cases, the boot 20 is attached to the boot insertion port 17 in such a manner that its end part does not reach the adhesive filling part 13, as illustrated in FIG. 11. The boot is disposed so as to block the rear part of the adhesive filling part 13, as illustrated in FIG. 11. This prevents the adhesive from leaking from the rear end of the ferrule 10. In the comparative example, however, the adhesive filled in the adhesive filling part 13 may contract as a result of hardening, which may cause the ferrule 10 to deform. In order to suppress such deformation of the ferrule 10 due to contraction of the adhesive, the amount of adhesive filled in the adhesive filling part 13 may be reduced. However, simply reducing the amount of adhesive may cause insufficient fixation of the optical fibers 1.

To deal with this, in one or more embodiments, as illustrated in FIGS. 2 and 3B, a part of the boot 20 (more specifically, the protrusion part 231) is disposed in opposition to the upper surface of the stepped part 15. With this configuration, the adhesive required to fix the optical fibers 1 can be applied around the optical fibers 1 while reducing the amount of adhesive filled in the adhesive filling part 13. This will be described below.

Figure 5A:
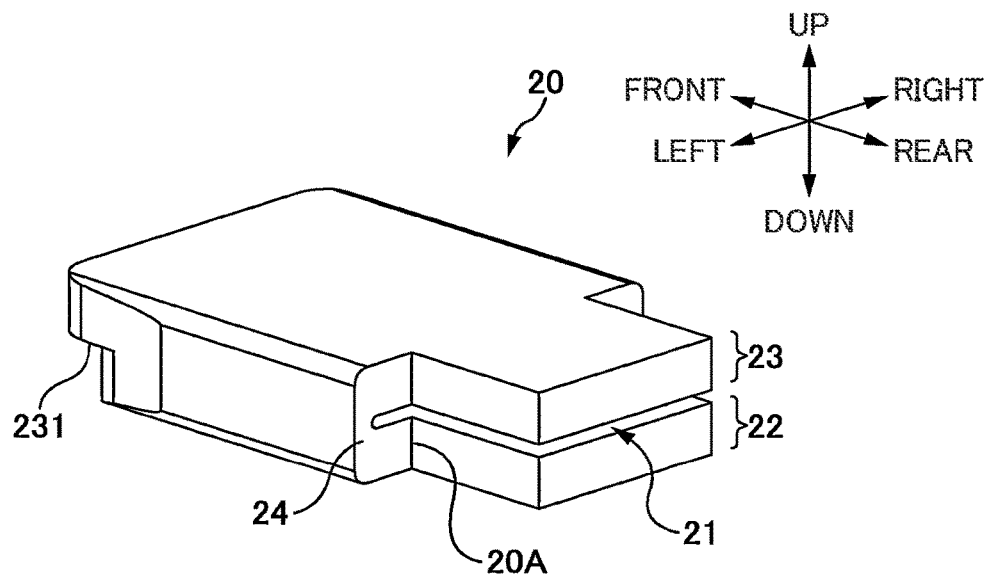
FIGS. 5A and 5B are perspective views of the boot 20 alone.
Figure 5B:
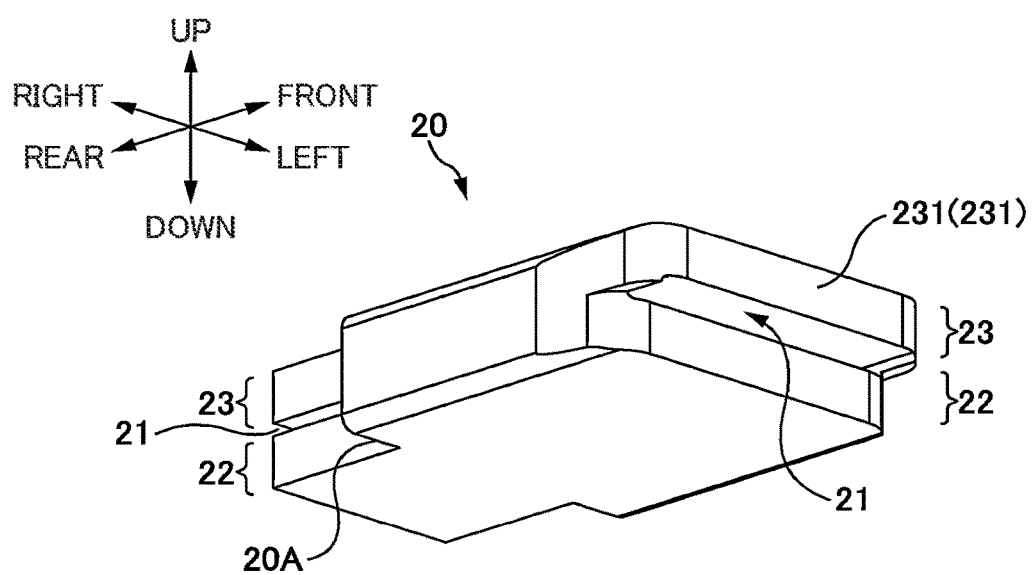

FIG. 4 illustrates orthographic projections of the boot 20 in one or more embodiments taken from various directions. FIGS. 5A and 5B are perspective views of the boot 20 alone.

The boot 20 is a member that protects the optical fibers 1. The boot 20 is constituted by a flexible material (for example, resin) and is elastically deformable. Thus, the boot 20 can suppress load (for example, bending stress) applied to the plurality of optical fibers 1. As illustrated in FIGS. 2 and 3B, in a state where the boot 20 is attached to the ferrule 10, the central part of the boot 20 in the fiber insertion direction (the front-rear direction) is disposed so as to be sandwiched between upper and lower inner wall surfaces of the ferrule 10. In one or more embodiments, as illustrated in FIGS. 2 and 3B, a front-side part of the boot 20 (the boot's part more toward the front than the part sandwiched between the upper and lower inner wall surfaces of the ferrule 10) is disposed inside the adhesive filling part 13. A rear-side part of the boot located more toward the rear than the part sandwiched between the upper and lower inner wall surfaces of the ferrule 10 protrudes rearward from the ferrule 10 and constitutes a part (strain relief) that suppresses bending stress applied to the optical fibers 1.

The boot 20 includes a fiber insertion hole 21. The fiber insertion hole 21 is a through-hole configured to insert the plurality of optical fibers 1. Hence, the fiber insertion hole 21 is formed as a through-hole along the fiber insertion direction (the front-rear direction; the optical axis direction of the optical fibers 1). The fiber insertion hole 21 is formed such that an optical fiber ribbon constituted by the plurality of optical fibers 1 can be inserted. Hence, the fiber insertion hole 21 has a cross-sectional shape extending in the width direction (the left-right direction).

Moreover, the fiber insertion hole 21 is disposed in correspondence with the disposition of the fiber holes 12 of the ferrule 10. Hence, the fiber insertion hole 21 is disposed such that, in a state where the boot 20 is attached to the ferrule 10, it is aligned at the same height as the fiber holes 12 of the ferrule 10 and the upper surface of the stepped part 15 (or the guide grooves 15A).

The boot 20 includes a lower part 22 and an upper part 23. Note that, the boot 20 has a shape in which the lower part 22 and the upper part 23, shaped as two blocks, are connected together at both ends in the width direction. In the descriptions below, the parts where the lower part 22 and the upper part 23 are connected on the outer sides of the fiber insertion hole 21 in the width direction may be referred to as connected parts 24. A space surrounded by the lower part 22, the upper part 23, and a pair of the connected parts 24 is the fiber insertion hole 21.

The lower part 22 is disposed on one side (the lower side or bottom side) with respect to the fiber insertion hole 21. In other words, in a state where the boot 20 is attached to the ferrule 10, the lower part 22 is disposed on the opposite side from the upper opening 131 side of the ferrule 10. The lower part 22 is a part having a block shape (a plate shape) constituting the lower side of the boot 20 and may be referred to as a "lower block" or a "first block". The lower part 22 is disposed at the bottom (lower side) of the adhesive filling part 13 to fill a space on the bottom side of the adhesive filling part 13. In one or more embodiments, the lower opening 132 is provided in the lower surface of the ferrule 10. Note, however, that in cases where the ferrule 10 does not include a lower opening 132, the lower part 22 will be disposed in opposition to the bottom surface of the ferrule 10 (the bottom surface of the adhesive filling part 13).

The front-side end surface 22A of the lower part 22 is formed as a surface perpendicular to the fiber insertion direction (the attachment direction of the boot 20; the front-rear direction). The front-side end surface 22A of the lower part 22 serves as a contact surface that comes into contact with the second surface 14B of the inner wall 14 of the ferrule (the rear end surface of the stepped part 15) and functions as an alignment surface for aligning the attachment direction of the boot 20 (the front-rear direction).

The upper part 23 is disposed on the other side with respect to the fiber insertion hole 21 (the upper side; the opposite side from the side of the lower part 22). In other words, the upper part 23 is disposed on the side of the upper opening 131 of the ferrule 10 in a state where the boot 20 is attached to the ferrule 10. The upper part 23 is a part having a block shape (a plate shape) constituting the upper side of the boot 20 and may be referred to as an "upper block" or a "second block". The upper part 23 fills a space on the upper side of the adhesive filling part 13.

The upper part 23 includes a protrusion part 231. The protrusion part 231 protrudes relative to the end surface 22A of the lower part 22 in the fiber insertion direction. The protrusion part 231 is disposed at the front-side end part of the upper part 23. The fiber insertion hole 21 is disposed in correspondence with the disposition of the fiber holes 12 of the ferrule 10. The protrusion part 231 protrudes toward the front relative to the end surface 22A of the lower part 22 (a part on the lower side of the fiber insertion hole 21). Accordingly, in a state where the boot 20 is attached to the ferrule 10, the protrusion part 231 opposes the upper surface of the stepped part 15 (or the guide grooves 15A) inside the adhesive filling part 13. More specifically, a lower surface of the protrusion part 231 serves as an opposition surface that opposes the upper surface of the stepped part 15. By disposing the protrusion part 231 in opposition to the upper surface of the stepped part 15 inside the adhesive filling part 13, the upper part 23 can fill the space of the adhesive filling part 13 that is on the side of the upper opening 131 (the upper side) with respect to the stepped part 15.

Figure 6A:
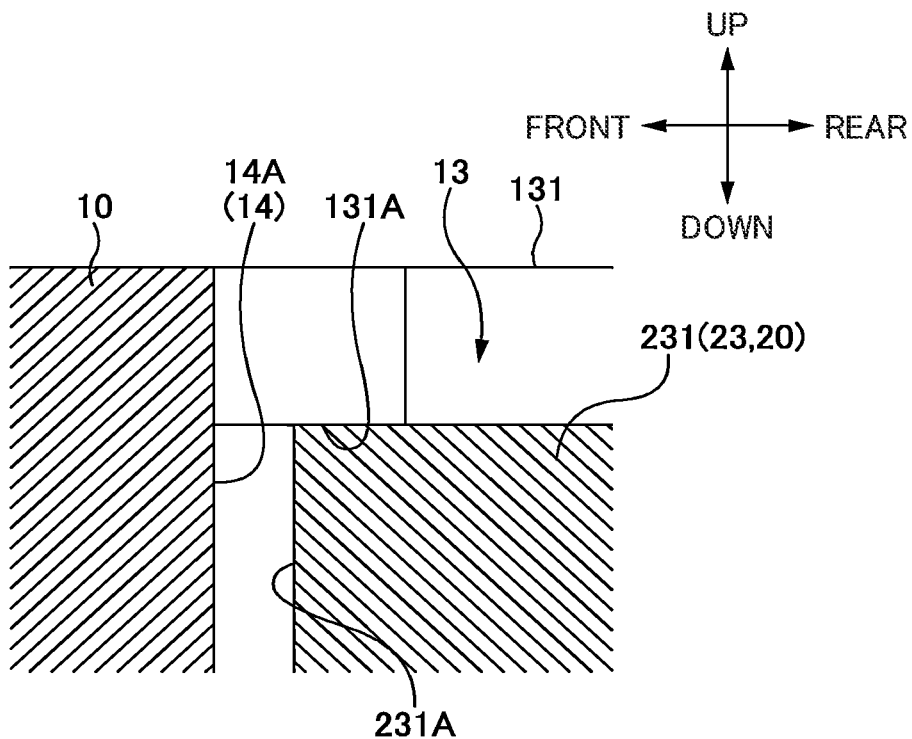
FIG. 6A is an enlarged cross-sectional view of the vicinity of a clearance between an end surface 231A of a protrusion part 231 and a first surface 14A of the ferrule 10.

FIG. 6A is an enlarged cross-sectional view of the vicinity of a clearance between an end surface 231A of the protrusion part 231 and the first surface 14A of the ferrule 10. Note that, FIG. 6A is an enlarged explanatory view of region A in FIG. 3B.

The end surface 231A of the protrusion part 231 is disposed in opposition to the first surface 14A, which includes the openings of the fiber holes 12. Since the protrusion part 231 protrudes from the lower part 22, it is possible to reduce the clearance between the end surface 231A of the boot 20 (the protrusion part 231) and the first surface 14A, compared to cases where no protrusion part 231 is provided to the boot 20. The clearance between the end surface 231A of the protrusion part 231 and the first surface 14A opens upward in the upper opening 131. The adhesive is filled through this clearance. Once the adhesive is filled through the clearance which opens in the upper opening 131 (the clearance between the end surface 231A of the protrusion part 231 and the first surface 14A), the adhesive flows into the interior by capillary action (described later).

Figure 7A:
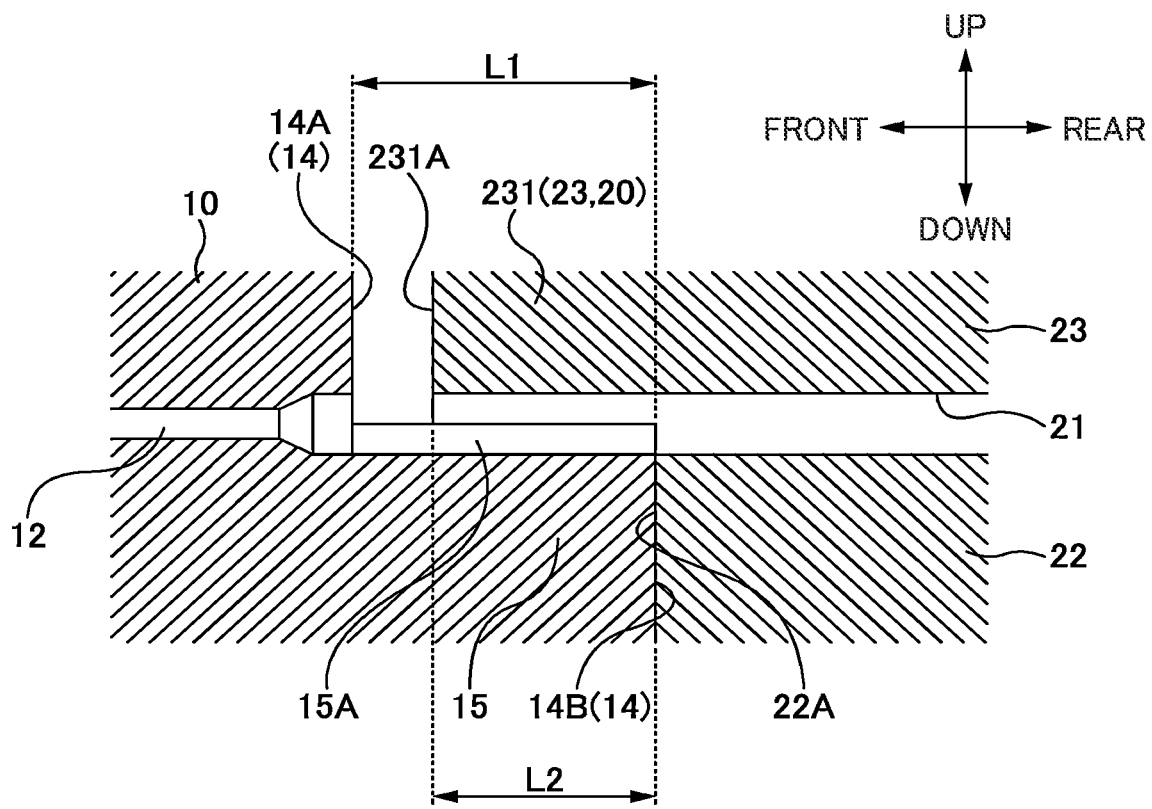
FIG. 7A is an enlarged view of the vicinity of a front end of a fiber insertion hole 21.

In one or more embodiments, the protrusion length of the protrusion part 231 protruding from the end surface 22A of the lower part 22 (protrusion length L2 illustrated in FIG. 7A; the dimension between the end surface 22A of the lower part 22 and the end surface 231A of the upper part 23 in the fiber insertion direction) is shorter than the length of the stepped part 15 in the fiber insertion direction (length L1 illustrated in FIG. 7A; the length of the guide grooves 15A; the dimension between the first surface 14A and the second surface 14B in the fiber insertion direction). In other words, the protrusion length L2 of the protrusion part 231 is less than the length L1 of the stepped part 15 in the fiber insertion direction (L2<L1). Thus, in a state where the end surface 22A of the lower part 22 of the boot 20 and the second surface 14B of the stepped part 15 are in contact with each other (see FIGS. 2 and 3B), it is possible to form a clearance for filling the adhesive between the end surface 231A of the protrusion part 231 and the first surface 14A of the ferrule 10 as illustrated in FIG. 6A. In one or more embodiments, since the protrusion length L2 of the protrusion part 231 is less than the length L1 of the stepped part 15 in the fiber insertion direction (L2<L1), it is possible to align the attachment direction of the boot 20 (the front-rear direction) with respect to the ferrule 10 by bringing the end surface 22A of the lower part 22 of the boot 20 in contact with the second surface 14B of the stepped part 15.

Incidentally, as illustrated in FIG. 6A (and FIG. 2), a retaining part 131A is disposed on the upper-side wall surface of the adhesive filling part 13 of the ferrule 10. The retaining part 131A holds down the protrusion part 231 of the boot 20 from the upper side. The retaining part 131A is located at both ends in the width direction in the vicinity of the front edge of the upper opening 131. In a state where the boot 20 is attached to the ferrule 10, the retaining part 131A is disposed on the upper side of both edges (both corners) in the width direction of the protrusion part 231 of the boot 20. In other words, the protrusion part 231 of the boot 20 is formed to be disposed on the lower side of the upper-side wall surface (the retaining part 131A) of the adhesive filling part 13 of the ferrule 10. By disposing the retaining part 131A on the upper side of the protrusion part 231 of the boot 20, it is possible to suppress the protrusion part 231 of the boot 20 from being displaced toward the upper side inside the adhesive filling part 13, and the protrusion part 231 can be disposed stably inside the adhesive filling part 13. Note that, the retaining part 131A is disposed on only the upper side of both edges, in the width direction, of the protrusion part 231 of the boot 20, and is not disposed on the upper side of the central part, in the width direction, of the protrusion part 231. Thus, as illustrated in FIG. 6A, the upper part of the clearance between the end surface 231A of the protrusion part 231 and the first surface 14A of the ferrule 10 can be opened, and the adhesive can be filled through this clearance. Note that, the ferrule 10 does not have to include the retaining part 131A.

Figure 6B:
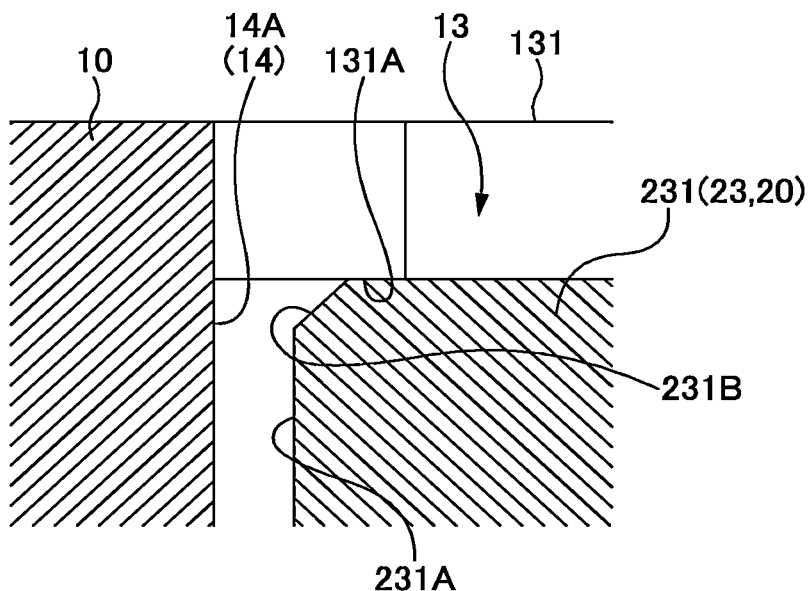
FIG. 6B is an explanatory view of the protrusion part 231 in a modified example.

FIG. 6B is an explanatory view of the protrusion part 231 in a modified example.

The protrusion part 231 in the modified example has an inclined surface 231B between the upper surface of the protrusion part 231 (the surface on the side of the upper opening 131) and the end surface 231A of the protrusion part 231. In other words, the protrusion part 231 in the modified example has an inclined surface 231B on an upper edge of the end surface 231A. Thus, the adhesive can be filled easily between the end surface 231A of the protrusion part 231 and the first surface 14A of the ferrule 10. Note that, as illustrated in FIG. 6B, also in cases where the protrusion part 231 is provided with the inclined surface 231B, the retaining part 131A of the ferrule 10 may hold down the protrusion part 231 of the boot 20 from the upper side.

Figure 7B:
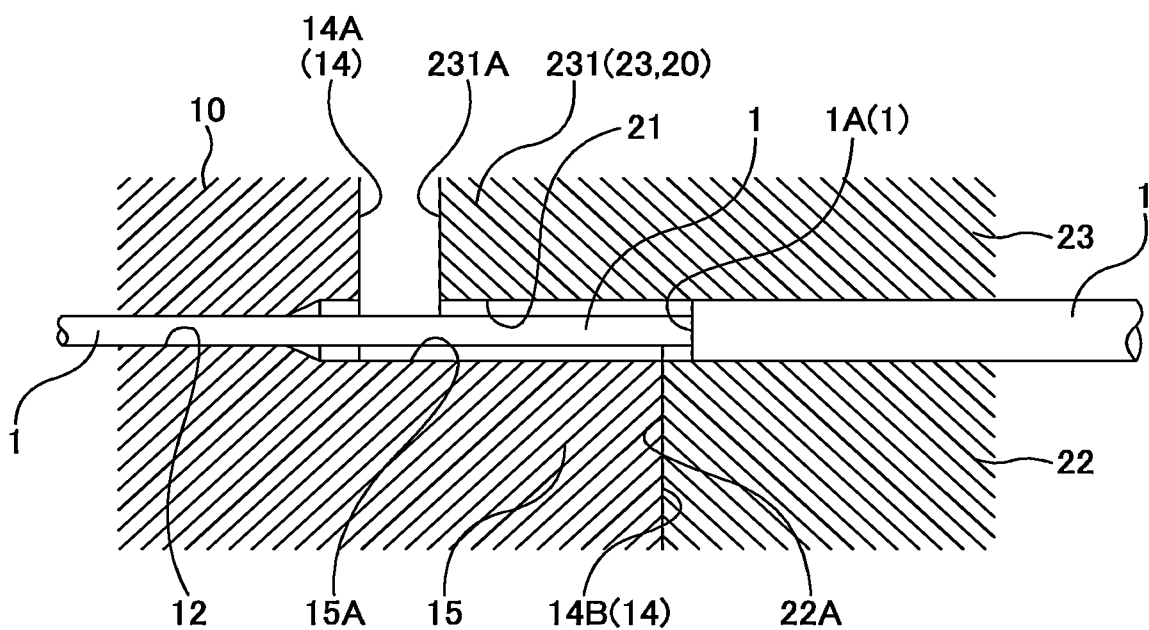
FIG. 7B is an enlarged view of the vicinity of the front end of the fiber insertion hole 21 in a state where an optical fiber 1 is inserted.

FIG. 7A is an enlarged view of the vicinity of the front end of the fiber insertion hole 21. FIG. 7B is an enlarged view of the vicinity of the front end of the fiber insertion hole 21 in a state where the optical fibers 1 have been inserted. Note that, FIG. 7A is an enlarged explanatory view of region B in FIG. 3B.

As illustrated in FIG. 7B, the fiber insertion hole 21 is formed so as to conform to the diameter of the optical fiber 1 having a coating. For example, the diameter of the optical fiber 1 (the outer diameter of the coating) is 250 μm, and the dimension of the fiber insertion hole 21 in the up-down direction (the clearance between the lower part 22 and the upper part 23) is 260 μm. Hence, the location, in the up-down direction, of the lower surface of the upper part 23 is substantially the same as the location of the upper edge of the optical fiber 1 (the optical fiber 1 having the coating) inserted through the fiber insertion hole 21. The tip (the front-side end part) of the optical fiber 1 is a bare optical fiber from which the coating has been removed. For example, the diameter of the bare optical fiber is 125 μm. A peeled edge 1A of the coating (i.e., the front end of the coating of the optical fiber 1) is disposed more toward the rear (toward the side of the boot insertion port 17) than the second surface 14B of the stepped part 15 (or the guide grooves 15A). Hence, as illustrated in FIG. 7B, the peeled edge 1A of the coating is disposed inside the fiber insertion hole 21. In this state, the bare optical fibers will extend out from the opening of the fiber insertion hole 21 toward the front side. Further, the bare optical fibers will be disposed above the upper surface of the stepped part 15 (the guide grooves 15A).

As illustrated in FIG. 7A, the lower surface of the protrusion part 231 constitutes an opposition surface that comes into opposition with the upper surface of the stepped part 15. Further, as illustrated in FIG. 7A, the lower surface of the protrusion part 231 is located on an extension of the upper edge of the fiber insertion hole 21. Since the fiber insertion hole 21 is formed so as to conform to the diameter of the optical fiber 1 having the coating, by locating the lower surface of the protrusion part 231 (the opposition surface that opposes the upper surface of the stepped part 15) on an extension of the upper edge of the fiber insertion hole 21 as in one or more embodiments, a clearance corresponding to the diameter of the optical fiber 1 having the coating is formed between the lower surface of the protrusion part 231 and the upper surface of the stepped part 15 (herein, the guide grooves 15A), as illustrated in FIG. 7A. When the bare optical fibers are disposed between the lower surface of the protrusion part 231 and the upper surface of the stepped part 15 (the guide grooves 15A), a narrow clearance amounting to the thickness of the coating will be formed around the bare optical fibers, as illustrated in FIG. 7B. Therefore, the adhesive can easily flow in around the bare optical fibers by capillary action.

As illustrated in FIG. 7B, the peeled edge 1A of the coating is disposed more toward the rear side (the side of the boot insertion port 17) than the second surface 14B of the stepped part 15 (or the guide grooves 15A). Hence, the coating's peeled edge is located inside the fiber insertion hole 21. As a result, as illustrated in FIG. 3B, when the ferrule structure 100 is viewed from the upper side, the peeled edge 1A of the coating is hidden by the upper part 23 of the boot 20, and it is impossible to confirm the position of the peeled edge 1A of the coating in the fiber insertion direction (the front-rear direction) from the upper opening 131. For this reason, an exposing part 232 may be provided to the boot 20, as described below.

Figure 8A:
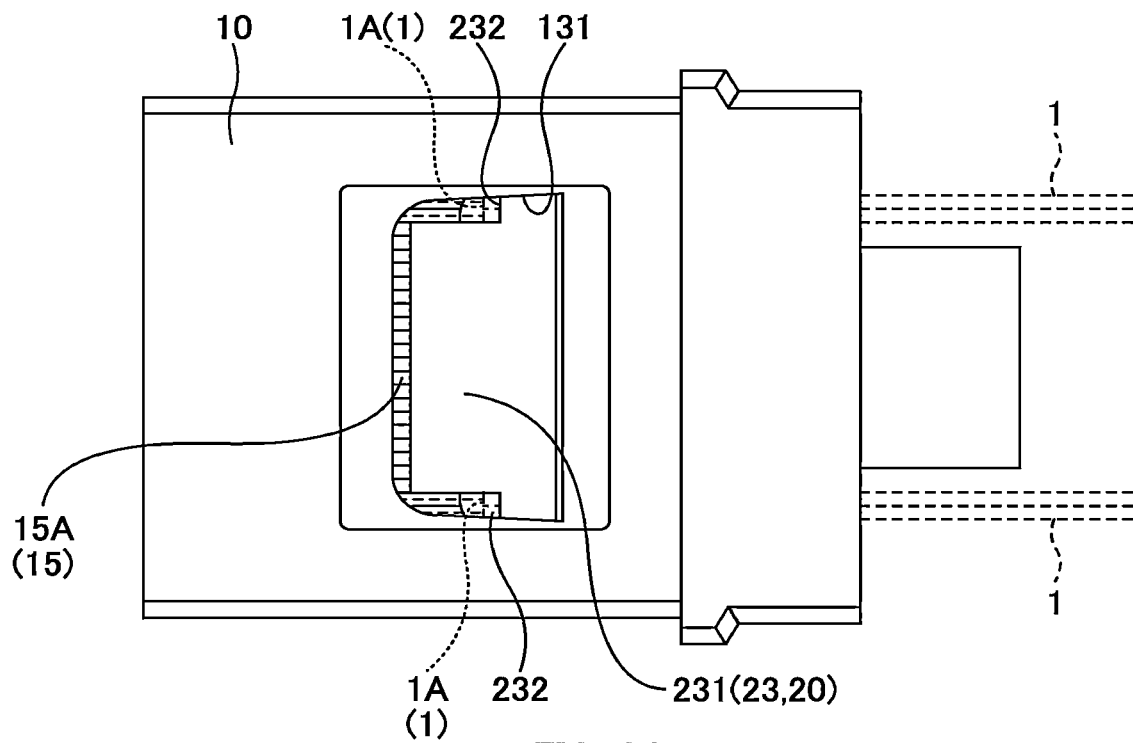
FIGS. 8A and 8B are explanatory views of an exposing part 232.
Figure 8B:
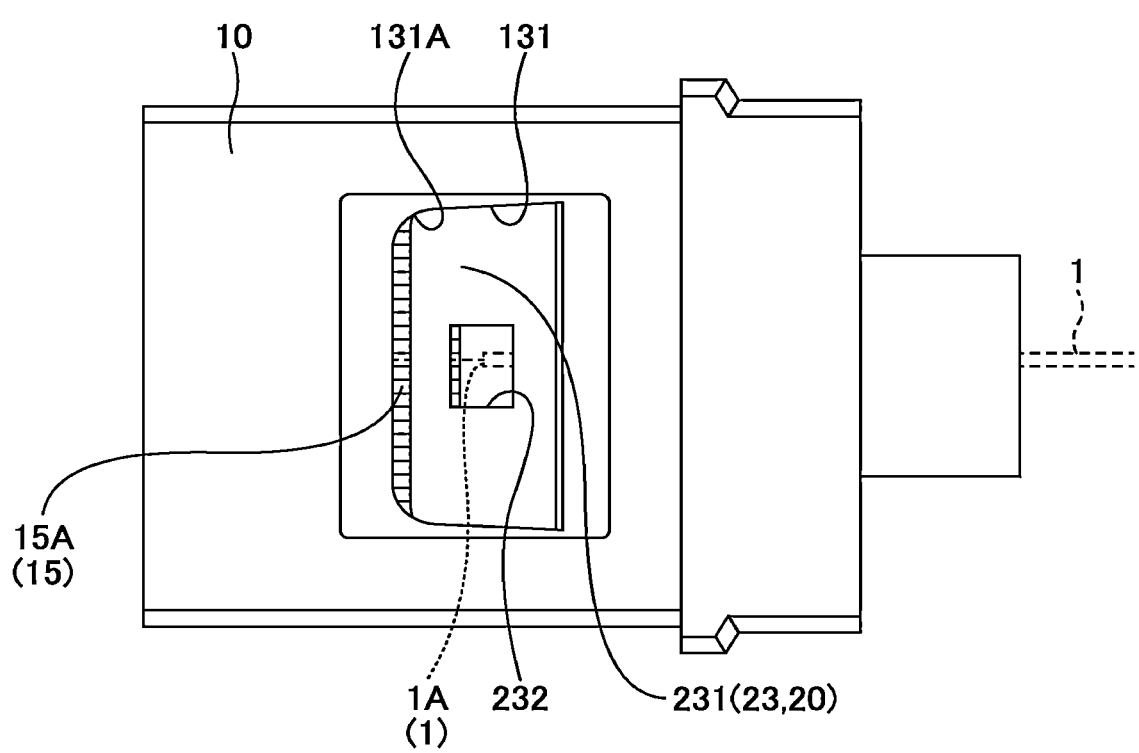

FIGS. 8A and 8B are explanatory views of an exposing part 232.

The boot 20 illustrated in FIGS. 8A and 8B includes an exposing part 232. The exposing part 232 is configured to expose the upper side of the optical fibers 1 inserted through the fiber insertion hole 21. The exposing part 232 is disposed more toward the rear than the front-side end surface 22A of the lower part 22. In other words, in a state where the boot 20 is attached to the ferrule 10, the exposing part 232 is disposed more toward the rear than the second surface 14B of the stepped part 15 (or the guide grooves 15A). Also, in a state where the boot 20 is attached to the ferrule 10, the exposing part 232 is disposed more toward the front than a rear edge of the upper opening 131. With this configuration—wherein the exposing part 232 is disposed between the second surface 14B of the stepped part 15 (or the guide grooves 15A) and the rear edge of the upper opening 131 in a state where the boot 20 is attached to the ferrule 10—it is possible to confirm the position of the coating's peeled edge 1A in the fiber insertion direction (the front-rear direction) from the upper opening 131 via the exposing part 232, as illustrated in FIGS. 8A and 8B.

Note that, the exposing part 232 may have any shape as long as it is possible to expose the upper side of some of the optical fibers 1 among the plurality of optical fibers 1 inserted through the fiber insertion hole 21. This is because, since the coating of the optical fiber ribbon is removed in such a manner that the positions of the coating's peeled edges 1A of the respective optical fibers 1 are aligned, it is sufficient if it is possible to confirm the position, in the fiber insertion direction, of the coating's peeled edge 1A of at least some of the optical fibers 1. Therefore, the exposing part 232 does not have to expose the upper side of all the optical fibers 1.

As illustrated in FIG. 8A, the exposing part 232 can be formed as a recessed part located on an end part of the boot 20 in the width direction. With the exposing part 232 illustrated in FIG. 8A, it is possible to confirm the position, in the fiber insertion direction, of the coating's peeled edge 1A of the optical fiber 1 located at the end part of the fiber insertion hole 21 in the width direction. Further, as illustrated in FIG. 8A, both ends in the width direction may be each provided with the recessed part. In this way, it is possible to confirm the positions, in the fiber insertion direction, of the coating's peeled edge 1A of the optical fibers 1 located at both ends in the width direction. As a result, it is possible to estimate that the peeled edges 1A of the other optical fibers 1 (the optical fibers 1 located in the central part in the width direction) are positioned on a line connecting the peeled edges 1A located at both ends.

As illustrated in FIG. 8B, the exposing part 232 can be formed as a window (an opening) located in the central part of the boot 20 in the width direction. With the exposing part 232 illustrated in FIG. 8B, it is possible to confirm the positions, in the fiber insertion direction, of the coating's peeled edge 1A of the optical fibers 1 located in the central part of the fiber insertion hole 21 in the width direction. As illustrated in FIG. 8B, by locating the exposing part 232 in the central part of the boot 20 in the width direction, the coating's peeled edge 1A of the optical fibers 1 can be confirmed in the central part of the upper opening 131 in the width direction. This facilitates the operator's confirmation work. Further, locating the exposing part 232 in the central part of the boot 20 in the width direction, as illustrated in FIG. 8B, achieves a structure with which the protrusion part 231 of the boot 20 can be easily disposed on the lower side of the retaining part 131A of the ferrule 10.

As illustrated in FIGS. 1A and 1B, the boot 20 in one or more embodiments includes a recessed part 20A. The recessed part 20A is a recess located in a rear part of the boot 20. As illustrated in FIG. 3A, in a state where the boot 20 is attached to the ferrule 10, the recessed part 20A is located more toward the front than the rear end surface of the ferrule 10. Thus, when the adhesive filled in the adhesive filling part 13 flows into the interior of the ferrule (described later), it is possible to suppress the adhesive from leaking toward the rear of the rear end surface of the ferrule 10, even if the adhesive flows in between the boot insertion port 17 of the ferrule 10 and the boot 20. Note, however, that the boot 20 does not have to include the recessed part 20A.

Manufacturing Method:

FIGS. 9A to 9D are explanatory views of a method for manufacturing a ferrule-equipped fiber.

First, an operator prepares a ferrule 10 and a boot 20 individually. Note that, as already described, the ferrule 10 includes: a plurality of fiber holes 12 that are disposed to be arrayed in one direction; an adhesive filling part 13 that is configured to be filled with an adhesive; and a stepped part 15 that is configured to guide a plurality of optical fibers 1 to the fiber holes 12. Moreover, as described already, the boot 20 includes: a fiber insertion hole 21; a lower part 22 disposed on one side with respect to the fiber insertion hole 21; and an upper part 23 disposed on the other side with respect to the fiber insertion hole 21. The upper part 23 includes a protrusion part 231 that protrudes relative to the end surface 22A of the lower part 22 in the fiber insertion direction.

The operator performs pretreatment on a plurality of optical fibers 1. For example, as a pretreatment for the optical fibers 1, the operator removes the coating of the optical fiber ribbon (i.e., removes the coating of each of the optical fibers 1) and cuts the bare optical fibers such that the bare optical fibers have a predetermined length.

Next, as illustrated in FIG. 9A, the operator inserts the plurality of optical fibers 1 (the optical fiber ribbon) into the fiber insertion hole 21 of the boot 20. Note that, the operator inserts the plurality of optical fibers 1 (the optical fiber ribbon) into the boot 20 such that the tips of the optical fibers 1 (the bare optical fibers) protrude more toward the front than the protrusion part 231 of the boot 20.

Further, as illustrated in FIG. 9A, the operator applies an adhesive in the vicinity of each fiber hole 12's opening on the side of the adhesive filling part 13, to thereby apply the adhesive to the fiber holes 12. Note that, the operator may apply the adhesive to the interior of the fiber holes 12 by first applying the adhesive in the vicinity of each fiber hole 12's opening on the side of the adhesive filling part 13 and then sucking the adhesive from the side of the connection end surface 10A of the ferrule 10. By applying the adhesive to the fiber holes 12 in advance, it is possible to suppress air bubbles from entering the fiber holes 12.

Next, as illustrated in FIG. 9B, the operator inserts the plurality of optical fibers 1, which have been passed through the boot 20, respectively into the corresponding fiber holes 12 of the ferrule 10. In this process, the operator inserts the optical fibers 1 into the fiber holes 12 while guiding the optical fibers 1 by the upper surface of the stepped part 15 of the ferrule 10 (herein, the respective guide grooves 15A).

Next, as illustrated in FIG. 9C, the operator inserts the boot 20 into the boot insertion port 17 of the ferrule 10, to attach the boot 20 to the ferrule 10. In this process, as illustrated in FIG. 9C, the operator inserts the boot 20 into the ferrule 10 until the end surface 22A of the lower part 22 of the boot 20 is placed in contact with the second surface 14B of the stepped part 15 of the ferrule 10. When the end surface 22A of the lower part 22 of the boot 20 comes into contact with the second surface 14B of the stepped part 15 of the ferrule a clearance is formed through which the adhesive can be introduced between the end surface 231A of the protrusion part 231 and the first surface 14A of the ferrule 10. Further, the lower surface of the protrusion part 231 is disposed in opposition to the upper surface of the stepped part 15, thus forming therebetween a clearance roughly the diameter of the optical fiber 1 (see FIGS. 7A and 7B).

Note that, in this process, the operator disposes both edges (both corners), in the width direction, of the protrusion part 231 of the boot 20 on the lower side of the upper-side wall surface (the retaining part 131A) of the adhesive filling part 13 of the ferrule 10. In cases where the boot 20 includes the exposing part 232 (see FIGS. 8A and 8B), the operator can confirm the position of the peeled edge 1A of the coating in the fiber insertion direction (front-rear direction) from the upper opening 131 via the exposing part 232 after the boot 20 is attached to the ferrule 10.

Next, as illustrated in FIG. 9D, the operator applies the adhesive to the clearance between the end surface 231A of the protrusion part 231 and the first surface 14A of the ferrule 10. The adhesive applied to the clearance flows into the interior by capillary action, and thus, the adhesive is applied to the guide grooves 15A and around the optical fibers 1 disposed in the guide grooves 15A. After the application of the adhesive, the adhesive is hardened, and thereby the optical fibers 1 are fixed to the ferrule 10, thus completing the manufacturing of the ferrule-equipped fiber.

In one or more embodiments, the boot 20 is disposed inside the adhesive filling part 13. Thus, it is possible to reduce the amount of adhesive filled into the adhesive filling part 13, and as a result, it is possible to suppress deformation of the ferrule 10 even if the adhesive contracts when the adhesive is hardened.

Further, in one or more embodiments, the boot 20 includes the protrusion part 231. Thus, the clearance between the protrusion part 231 of the boot 20 and the first surface 14A of the ferrule 10 can be narrowed, thus enabling the adhesive to easily flow into the interior by capillary action. In addition, in one or more embodiments, it is possible to narrow the clearance between the lower surface of the protrusion part 231 and the upper surface of the stepped part 15 (or the guide grooves 15A), and it is also possible to narrow the clearance around the optical fibers 1 (the bare optical fibers) disposed above the upper surface of the stepped part 15. Thus, the adhesive can easily spread over the upper surface of the stepped part 15 and around the optical fibers 1 disposed above the upper surface of the stepped part 15 by capillary action. Thus, in one or more embodiments, even if the amount of adhesive is small, it is possible to apply the adhesive onto the upper surface of the stepped part 15 and around the optical fibers 1, which makes it possible to fix the optical fibers to the ferrule with an adequate strength.

Second Embodiments

Figure 10A:
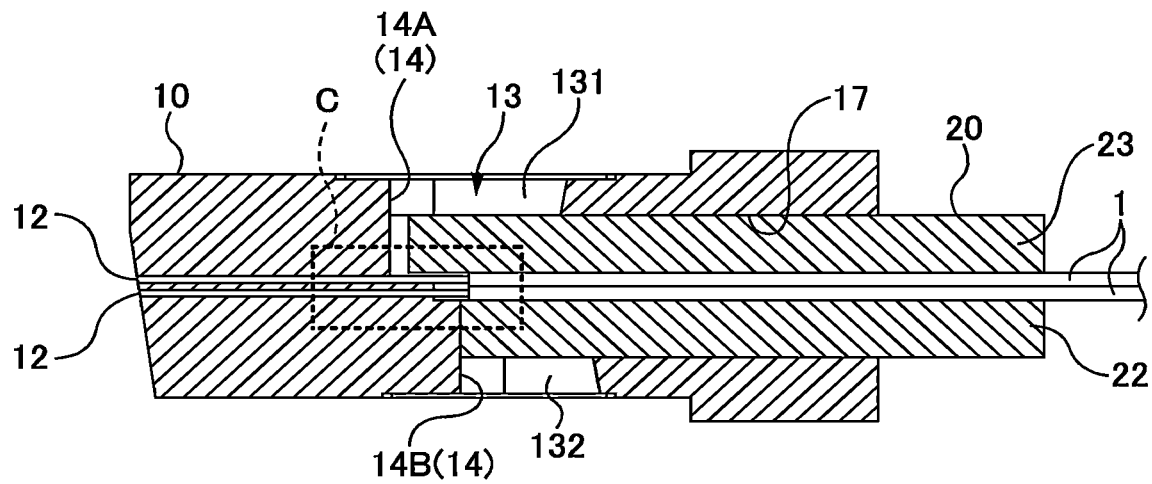
FIG. 10A is a cross-sectional view of a ferrule structure 100 in second embodiments.
Figure 10B:
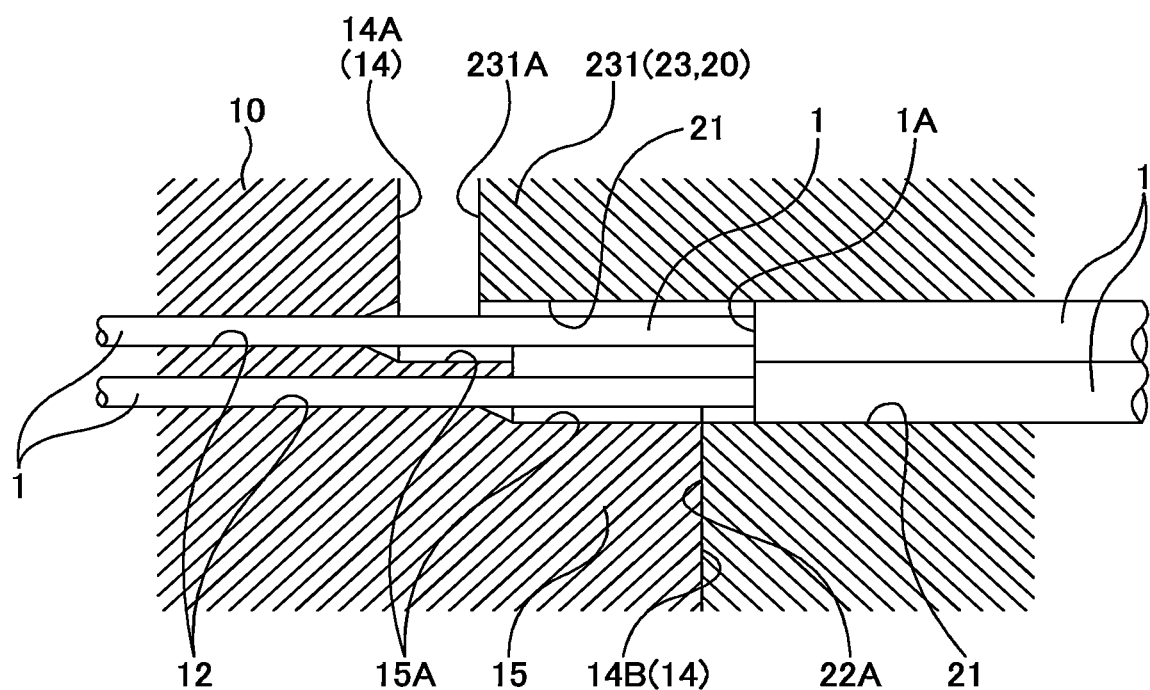
FIG. 10B is a partially enlarged view of the ferrule structure 100 in the second embodiments.

FIG. 10A is a cross-sectional view of a ferrule structure 100 of second embodiments. FIG. 10B is a partially enlarged view of the ferrule structure 100 of the second embodiments. Note that, FIG. 10B is an enlarged explanatory view of region C in FIG. 10A.

Also in the second embodiments, the ferrule structure 100 includes a ferrule 10 and a boot 20. Also in the second embodiments, the ferrule 10 includes a plurality of fiber holes 12, an adhesive filling part 13, and a stepped part 15 including a plurality of guide grooves 15A. In the second embodiments, the ferrule 10 has two rows (fiber rows) of fiber holes 12 that are disposed to be arrayed in one direction (the direction perpendicular to the paper face of the figure). The two fiber rows are disposed side by side in the up-down direction.

A plurality of optical fibers 1 of an optical fiber ribbon are inserted into the plurality of fiber holes 12 of each fiber row. In the second embodiments, the plurality of optical fibers 1 are fixed to the ferrule 10 in a state where two optical fiber ribbons are stacked on top of one another.

The stepped part 15 includes two rows (guide groove rows) of a plurality of guide grooves 15A that are disposed to be arrayed in one direction (the direction perpendicular to the paper face of the figure). The two guide groove rows are formed as steps. In both the guide groove rows, the front ends of the guide grooves 15A reach the inner wall 14 on the front side of the adhesive filling part 13. Also, in both the guide groove rows, the front ends of the guide grooves 15A are in communication with the openings of the fiber holes 12. The rear ends of the guide grooves 15A of the lower guide groove row reach the second surface 14B of the stepped part 15. On the other hand, the rear ends of the guide grooves of the upper guide groove row are provided only up to the central part of the stepped part 15 in the fiber insertion direction, and do not reach the second surface 14B. Note that, also in the second embodiments, the upper surface of the stepped part 15 does not have to include the guide grooves 15A.

Also in the second embodiments, the boot 20 includes a fiber insertion hole 21, a lower part 22, and an upper part 23. The upper part 23 includes a protrusion part 231 that protrudes relative to the end surface 22A of the lower part 22 in the fiber insertion direction. Also in the second embodiments, the fiber insertion hole 21 is disposed in correspondence with the disposition of the fiber holes 12 of the ferrule 10. In the second embodiments, the two optical fiber ribbons in a stacked state are inserted into the fiber insertion hole 21. Thus, in the second embodiments, the fiber insertion hole 21 is formed so as to conform to the two optical fiber ribbons in a stacked state. The dimension of the fiber insertion hole 21 in the up-down direction (the clearance between the lower part 22 and the upper part 23) corresponds to the thickness of two optical fiber ribbons. Note that, in cases where the two optical fiber ribbons are disposed in a separated manner in the up-down direction and the two fiber rows in the ferrule 10 are disposed relatively separated from one another in the up-down direction, the boot 20 may include two fiber insertion holes 21 separated from one another in the up-down direction. Also in the second embodiments, an adhesive is applied to the clearance between the end surface 231A of the protrusion part 231 and the first surface 14A of the ferrule 10, and the adhesive applied to the clearance flows into the interior by capillary action.

Also in the second embodiments, the lower surface of the protrusion part 231 constitutes an opposition surface that comes into opposition with the upper surface of the stepped part 15 (herein, the guide grooves 15A). Further, also in the second embodiments, the lower surface of the protrusion part 231 is located on an extension of the upper edge of the fiber insertion hole 21. In this way, also in the second embodiments, a clearance corresponding to the diameter of the optical fiber 1 having the coating is formed between the lower surface of the protrusion part 231 and the upper surface of the upper stage of the stepped part 15 (the upper guide grooves 15A). Note that, in the second embodiments, the clearance between the lower surface of the protrusion part 231 and the upper surface of the lower stage of the stepped part 15 (the lower guide grooves 15A) is relatively large. However, between the lower surface of the protrusion part 231 and the upper surface of the lower stage of the stepped part 15, the plurality of optical fibers 1 (bare optical fibers) are disposed so as to be arrayed in two upper and lower rows, and thus, and a narrow clearance amounting to the thickness of the coating will be formed around the bare optical fibers. Therefore, also in the second embodiments, the adhesive can easily flow in around the bare optical fibers by capillary action.

OTHER EMBODIMENTS

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical fiber;
1A: Peeled edge;
10: Ferrule;
10A: Connection end surface;
10B: Flange part;
11: Guide hole;
12: Fiber hole;
13: Adhesive filling part;
131: Upper opening;
131A: Retaining part;
132: Lower opening;
14: Inner wall;
14A: First surface;
14B: Second surface;
15: Stepped part;
15A: Guide groove;
17: Boot insertion port;
20: Boot;
20A: Recessed part;
21: Fiber insertion hole;
22: Lower part;
22A: End surface;
23: Upper part;
231: Protrusion part;
231A: End surface;
231B: Inclined surface;
232: Exposing part;
24: Connected part;
100: Ferrule structure.

The invention claimed is:

1. A boot configured to be attached to a ferrule, the boot comprising:
   a fiber insertion hole into which optical fibers are inserted, wherein the fiber insertion hole is disposed to correspond with fiber holes of the ferrule that are disposed in an array in one direction;
   a lower part on one side with respect to the fiber insertion hole; and
   an upper part on another side with respect to the fiber insertion hole, wherein
   the upper part comprises a protrusion part that protrudes relative to an end surface of the lower part in a fiber insertion direction, and
   the ferrule comprises:
      an adhesive filling part configured to be filled with an adhesive; and
      a stepped part that guides the optical fibers into the fiber holes.

2. The boot according to claim 1, wherein a protrusion length of the protrusion part is less than a length of the stepped part in the fiber insertion direction.

3. The boot according to claim 2, wherein the protrusion part has an inclined surface between a surface of the protrusion part on an opening side of the adhesive filling part and an end surface of the protrusion part in the fiber insertion direction.

4. The boot according to claim 1, wherein a lower surface of the protrusion part is disposed on an extension of an upper edge of the fiber insertion hole.

5. The boot according to claim 1, further comprising an exposing part that exposes the optical fibers inserted through the fiber insertion hole.

6. The boot according to claim 5, wherein the exposing part is formed as recessed parts on both ends in a width direction in which the optical fibers are disposed.

7. The boot according to claim 5, wherein the exposing part is formed as a window in a central part in a width direction in which the optical fibers are disposed.

8. A ferrule structure comprising:
   a ferrule comprising:
      fiber holes that are disposed in an array in one direction;
      an adhesive filling part configured to be filled with an adhesive; and
      a stepped part that guides optical fibers into the fiber holes; and
   a boot configured to be attached to the ferrule, wherein the boot comprises:
      a fiber insertion hole into which the optical fibers are inserted, wherein the fiber insertion hole is disposed to correspond with the fiber holes;
      a lower part on one side with respect to the fiber insertion hole; and
      an upper part on another side with respect to the fiber insertion hole, and the upper part comprises a protrusion part that protrudes relative to an end surface of the lower part in a fiber insertion direction.

9. The ferrule structure according to claim 8, wherein
the ferrule comprises a retaining part on a wall surface on an upper side of the adhesive filling part, and
the protrusion part is disposed on a lower side of the retaining part.

10. A method for manufacturing a ferrule-equipped fiber comprising:
preparing a ferrule comprising:
fiber holes that are disposed to be arrayed in one direction;
an adhesive filling part configured to be filled with an adhesive; and
a stepped part that guides optical fibers to the fiber holes;

preparing a boot comprising:
a fiber insertion hole to which the plurality of optical fibers are inserted and that is disposed in correspondence with disposition of the fiber holes;
a lower part on one side with respect to the fiber insertion hole; and
an upper part disposed on another side with respect to the fiber insertion hole, wherein the upper part comprises a protrusion part that protrudes relative to an end surface of the lower part in a fiber insertion direction;

attaching the boot to the ferrule with the protrusion part in opposition to the stepped part inside the adhesive filling part; and fixing the optical fibers to the ferrule by filling an adhesive into a clearance between an inner wall of the adhesive filling part and the protrusion part.

* * * * *